(12) United States Patent
Yamaguchi et al.

(10) Patent No.: US 11,043,238 B1
(45) Date of Patent: Jun. 22, 2021

(54) MAGNETIC RECORDING MEDIUM AND MAGNETIC STORAGE DEVICE

(71) Applicant: SHOWA DENKO K.K., Tokyo (JP)

(72) Inventors: Takehiro Yamaguchi, Chiba (JP); Takayuki Fukushima, Chiba (JP); Lei Zhang, Chiba (JP); Hisato Shibata, Chiba (JP); Chen Xu, Chiba (JP); Hiroshi Koyanagi, Chiba (JP); Yuji Umemoto, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/116,223

(22) Filed: Dec. 9, 2020

(30) Foreign Application Priority Data

Dec. 27, 2019 (JP) .............................. JP2019-238097

(51) Int. Cl.
*G11B 5/73* (2006.01)
*G11B 5/706* (2006.01)

(52) U.S. Cl.
CPC ............ *G11B 5/70615* (2013.01); *G11B 5/73* (2013.01)

(58) Field of Classification Search
None
See application file for complete search history.

(56) References Cited

U.S. PATENT DOCUMENTS

| | | | | |
|---|---|---|---|---|
| 8,792,313 B2* | 7/2014 | Niwa | ..................... | G11B 5/737 |
| | | | | 369/13.33 |
| 8,941,950 B2* | 1/2015 | Yuan | ........................ | G11B 5/65 |
| | | | | 360/135 |
| 10,127,939 B2* | 11/2018 | Niwa | .................... | G11B 5/4866 |
| 2014/0308542 A1* | 10/2014 | Zhang | .................... | G11B 5/737 |
| | | | | 428/831.2 |

FOREIGN PATENT DOCUMENTS

JP  2018-188726  11/2018

* cited by examiner

*Primary Examiner* — William J Klimowicz
(74) *Attorney, Agent, or Firm* — IPUSA, PLLC

(57) ABSTRACT

A magnetic recording medium includes a substrate; a soft magnetic underlayer laminated on the substrate; an amorphous barrier layer laminated on the soft magnetic underlayer; and a magnetic recording layer laminated on the amorphous barrier layer, wherein the soft magnetic underlayer includes Fe, B, Si, and one or more elements selected from the group consisting of Nb, Zr, Mo, and Ta, wherein the amorphous barrier layer includes Si, W, and one or more elements selected from the group consisting of Nb, Zr, Mo, and Ta, and wherein the magnetic recording layer includes an alloy having an $L1_0$ structure.

4 Claims, 3 Drawing Sheets

MAGNETIC RECORDING MEDIUM AND MAGNETIC STORAGE DEVICE

CROSS-REFERENCE TO RELATED APPLICATIONS

This application is based upon and claims priority to Japanese Patent Application No. 2019-238097, filed on Dec. 27, 2019, the entire contents of which are incorporated herein by reference.

BACKGROUND OF THE INVENTION

Field of the Invention

The present invention relates to magnetic recording media and magnetic storage devices.

Description of the Related Art

In recent years, the demand for increasing the capacity of magnetic storage devices such as hard disk drives has become increasingly stronger. The thermal assist recording method and high frequency assist recording method are known as ways to satisfy the requirement for the higher capacity the magnetic storage devices.

The thermal assist recording method is a method in which information is recorded by heating the magnetic recording media with a magnetic head equipped with a laser light source. On the other hand, the high frequency assist recording method is a method in which information is recorded by applying a high frequency magnetic field generated from a magnetic head equipped with a Spin Torque Oscillator (STO).

In the thermal assist recording method and the high frequency assist recording method, magnetic domain flip can be significantly reduced by the heat and high frequency magnetic field. Therefore, it is possible to apply a material having a high magnetocrystalline anisotropy constant Ku (hereinafter, referred to as a high Ku material) to the magnetic recording layer constituting the magnetic recording media. Therefore, it is possible to micronize the magnetic particles constituting the magnetic recording layer, while maintaining thermal stability, and the surface density of 1 Tbit/inch$^2$ can be achieved.

Order parameter of alloys such as FePt alloy having an $L1_0$ structure, CoPt alloy having an $L1_0$ structure, and CoPt alloy having an $L1_1$ structure are known as high Ku materials.

Patent Document 1 discloses a target having the following composition formula in the atomic ratio as a sputtering target used for forming the soft magnetic layer of the thermal assist magnetic recording media:

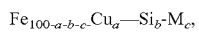

$Fe_{100-a-b-c}Cu_a$—$Si_b$-$M_c$, 0.1≤a≤5.0,
10.0≤b≤20.0, and
10.0≤c≤25.0, wherein M represents one or more elements selected from Nb and B, the remainder consists of inevitable impurities, and a transverse rupture strength is 500 MPa or higher.

RELATED ART DOCUMENTS

Patent Document 1: Japanese Patent Application Laid-Open No. 2018-188726

SUMMARY OF THE INVENTION

Problem to be Solved by the Invention

In order to improve the SNR and OW (overwriting) characteristics of the magnetic recording media, it is conceivable to use a soft magnetic layer made of amorphous or microcrystalline structure and to reduce the coercive force of the soft magnetic layer.

Here, when an alloy having an $L1_0$ structure is applied to the magnetic recording layer, the substrate is heated to a temperature of 500° C. or higher when forming the magnetic recording layer in order to improve the order parameter of the alloy.

However, there is a problem that when the soft magnetic layer formed on the substrate is heated to a high temperature, the soft magnetic layer is unable to maintain the amorphous or crystallite structure. Therefore, the crystal grain becomes coarse and the coercive force of the soft magnetic layer increases. As a result, the SNR and OW characteristics of the magnetic recording media are degraded.

An object of the present invention is to provide a magnetic recording medium capable of improving SNR and OW characteristics even when a substrate is heated to a high temperature during the formation of a magnetic recording layer.

Means for Solving Problems (1) A magnetic recording medium includes a substrate; a soft magnetic underlayer laminated on the substrate; an amorphous barrier layer laminated on the soft magnetic underlayer; and a magnetic recording layer laminated on the amorphous barrier layer, wherein the soft magnetic underlayer includes Fe, B, Si, and one or more elements selected from the group consisting of Nb, Zr, Mo, and Ta, wherein a content of B is in a range of 12% by mol to 16% by mol, and a content of Si is in a range from 5% by mol to 15% by mol, wherein the amorphous barrier layer includes Si, W, and one or more elements selected from the group consisting of Nb, Zr, Mo, and Ta, wherein a content of Si is in a range from 10% by mol to 30% by mol, and a content of W is in a range from 20% by mol to 60% by mol, and wherein the magnetic recording layer includes an alloy having an $L1_0$ structure.

(2) The magnetic recording medium according to (1), wherein a thickness of the amorphous barrier layer is in a range of 5 nm to 30 nm.

(3) The magnetic recording medium according to (1) or (2), wherein the amorphous barrier layer includes a TaWSi alloy.

(4) A magnetic storage device includes the magnetic recording medium of any one of (1) to (3).

Effects of the Invention

In accordance with the present invention, it is possible to provide a magnetic recording medium capable of improving SNR and OW characteristics when a substrate is heated to a high temperature when a magnetic recording layer is formed.

DESCRIPTION OF THE PREFERRED EMBODIMENTS

Hereinafter, an embodiment for carrying out the present invention will be described with reference to the drawings. For the sake of clarity, the drawings used in the following description may enlarge the features for convenience, and the dimensional proportions of each component are not necessarily the same.

[Magnetic Recording Medium]

Figure 1:
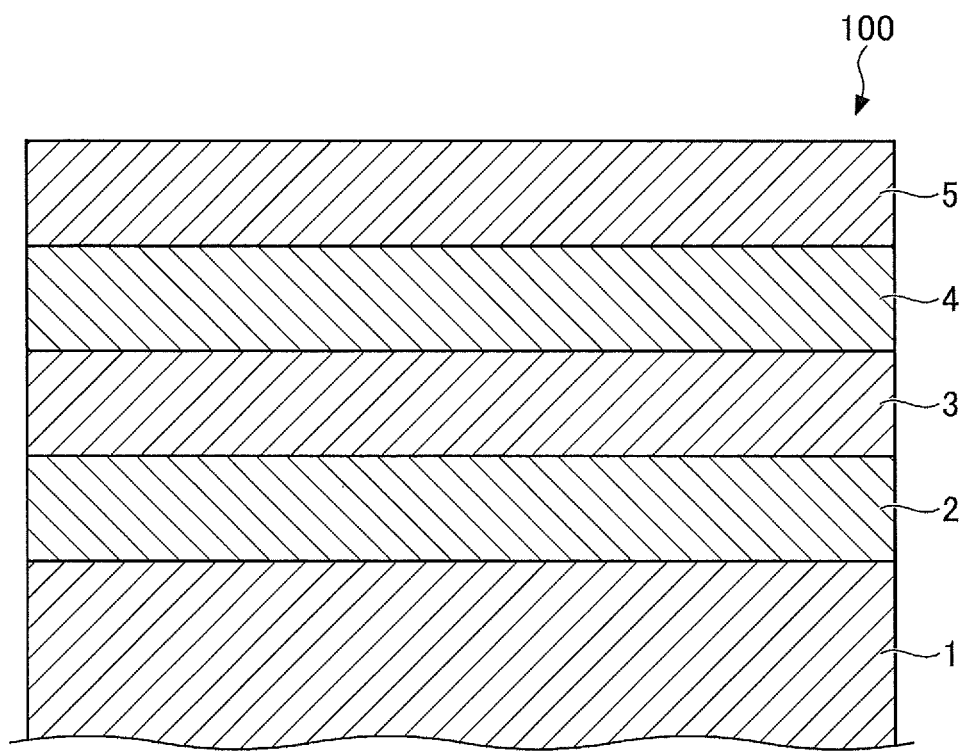
FIG. 1 is a cross-sectional view illustrating an example of a layered structure of a magnetic recording medium according to the present embodiment.

FIG. 1 shows an example of the layer structure of the magnetic recording medium according to the present embodiment.

In the magnetic recording medium 100, a substrate 1, a soft magnetic underlayer 2, an amorphous barrier layer 3, an intermediate layer 4, and a magnetic recording layer 5 are laminated in this order.

For example, a glass substrate may be used as the substrate 1, and it is preferable to use a heat-resistant glass substrate in consideration of heating when forming the magnetic recording layer 5.

The soft magnetic underlayer 2 includes Fe, B, Si, and one or more elements selected from the group consisting of Nb, Zr, Mo, and Ta.

The content of B in the soft magnetic underlayer 2 is in the range of 12% by mol to 16% by mol, and preferably in the range of 13.5% by mol to 15.5% by mol. When the content of B in the soft magnetic underlayer 2 is less than 12% by mol or more than 16% by mol, the SNR and OW characteristics of the magnetic recording medium 100, in which the substrate 1 is heated to a high temperature when the magnetic recording layer 5 is formed, are degraded.

The content of Si in the soft magnetic underlayer 2 is in the range of 5% by mol to 15% by mol, and preferably in the range of 5% by mol to 10% by mol. When the content of Si in the soft magnetic underlayer 2 is less than 5% by mol or more than 15% by mol, the SNR and OW characteristics of the magnetic recording medium 100, in which the substrate 1 is heated to a high temperature when the magnetic recording layer 5 is formed, are degraded.

Because the soft magnetic underlayer 2 includes Fe as the soft magnetic material, when the soft magnetic underlayer 2 is made of amorphous or microcrystalline structure, the SNR and OW characteristics of the magnetic recording medium 100 are improved.

Here, the particle size of the crystallite in the microcrystalline structure is preferably 100 nm or less.

The soft magnetic underlayer 2 includes a predetermined amount of B, Si, and one or more elements selected from the group consisting of Nb, Zr, Mo, and Ta, even when the substrate 1 is heated to a high temperature when forming the magnetic recording layer 5, the soft magnetic underlayer 2 maintains the amorphous or crystalline structure and suppresses coarsening of the crystal grains, thereby reducing the coercive force of the soft magnetic layer 2. At this time, if the crystal grain constituting the soft magnetic underlayer 2 becomes coarse, the surface smoothness of the soft magnetic underlayer 2 decreases, so that the (001)-orientation of an alloy having the $L1_0$ structure constituting the magnetic recording layer 5 decreases. As a result, the SNR and OW characteristics of the magnetic recording medium 100 would be degraded.

The content of one or more elements selected from the group consisting of Nb, Zr, Mo, and Ta in the soft magnetic underlayer 2 is preferably in the range of 3% by mol to 12% by mol, and more preferably in the range of 5% by mol to 9% by mol. When the content of one or more elements selected from the group consisting of Nb, Zr, Mo, and Ta in the soft magnetic underlayer 2 is 3% by mol or more and 12% by mol or less, the SNR and OW characteristics of the magnetic recording medium 100, in which the substrate 1 is heated to a high temperature when the magnetic recording layer 5 is formed, are improved.

The soft magnetic underlayer 2 preferably does not include Sc, Ti, V, Cr, Mn, Ni, Cu, or Zn. Therefore, the SNR and OW characteristics of the magnetic recording medium 100, in which the substrate 1 is heated to a high temperature when the magnetic recording layer 5 is formed, are improved.

The amorphous barrier layer 3 includes Si, W, and one or more elements selected from the group consisting of Nb, Zr, Mo, and Ta.

Preferably, the Si content in the amorphous barrier layer 3 is in the range of 10% by mol % to 30% by mol, and is preferably in the range of 15% by mol to 25% by mol. When the Si content in the amorphous barrier layer 3 is less than 10% by mol or greater than 30% by mol, the SNR and OW characteristics of the magnetic recording medium 100, in which the substrate 1 is heated to a high temperature when the magnetic recording layer 5 is formed, are degraded.

The content of W in the amorphous barrier layer 3 is preferably in the range of 20% by mol to 60% by mol, and preferably 30% by mol to 50% by mol. When the content of W in the amorphous barrier layer 3 is less than 20% by mol or greater than 60% by mol, the SNR and OW characteristics of the magnetic recording medium 100, in which the substrate 1 is heated to a high temperature when the magnetic recording layer 5 is formed, are degraded.

Because the amorphous barrier layer 3 contains a predetermined amount of Si, even when the substrate 1 is heated to a high temperature when the magnetic recording layer 5 is formed, it is possible to suppress the segregation of Si near the interface with the soft magnetic underlayer 2. That is, since the composition of the soft magnetic underlayer 2 and the amorphous barrier layer 3 is uniform and the surface smoothness of the magnetic recording layer 5 is improved, the (001)-orientation of an alloy having the $L1_0$ structure constituting the magnetic recording layer 5 is improved. As a result, the SNR and OW characteristics of the magnetic recording medium 100 are improved. At this time, if Si is segregated near the interface between the amorphous barrier layer 3 and the soft magnetic underlayer 2, the grain of the crystal constituting the soft magnetic underlayer 2 becomes coarse.

Because the amorphous barrier layer 3 includes a predetermined amount of W and one or more elements selected from the group consisting of Nb, Zr, Mo, and Ta, crystallization of the amorphous barrier layer 3 can be prevented even when the substrate 1 is heated to a high temperature when the magnetic recording layer 5 is formed. At this time, if the amorphous barrier layer 3 is crystallized, the surface smoothness of the amorphous barrier layer 3 decreases, so that the (001)-orientation of an alloy having the $L1_0$ structure constituting the magnetic recording layer 5 decreases. As a result, the SNR and OW characteristics of the magnetic recording medium 100 would be degraded.

Note that, because W and one or more elements selected from the group consisting of Nb, Zr, Mo, and Ta have high melting point, recrystallization of the amorphous barrier layer 3 can be suppressed.

The content of one or more elements selected from the group consisting of Nb, Zr, Mo, and Ta in the amorphous barrier layer 3 is preferably in the range of 35% by mol to 65% by mol, and more preferably in the range of 35% by mol to 55% by mol. When the content of one or more elements selected from the group consisting of Nb, Zr, Mo, and Ta in the amorphous barrier layer 3 is 35% by mol or more and 65% by mol or less, the SNR and OW characteristics of the magnetic recording medium 100, in which the substrate 1 is heated to a high temperature when the magnetic recording layer 5 is formed, are improved.

It is preferable that the amorphous barrier layer 3 is formed in contact with the soft magnetic underlayer 2 in order to prevent the segregation of Si in the vicinity of the interface with the soft magnetic underlayer 2.

The thickness of the amorphous barrier layer 3 is preferably in the range of 5 nm to 30 nm, and more preferably in the range of 10 nm to 20 nm. When the thickness of the amorphous barrier layer 3 is 5 nm or more, the SNR and OW characteristics of the magnetic recording medium 100, in which the substrate 1 is heated to a high temperature when the magnetic recording layer 5 is formed, are improved. When the thickness is 30 nm or less, the magnetic spacing loss between the soft magnetic underlayer 2 and the magnetic recording layer 5 is reduced, and the OW characteristic of the magnetic recording medium 100 is improved.

The amorphous barrier layer 3 preferably includes a TaWSi alloy. The TaWSi alloy prevents the recrystallization of the soft magnetic underlayer 2 and the amorphous barrier layer 3, and allows the soft magnetic underlayer 2 and the amorphous barrier layer 3 to maintain the amorphous or microcrystalline structure.

In the TaWSi alloy, it is preferable that the content of W is equal to or more than the content of Si, and the content of Ta is equal to or more than the content of W.

The material forming the intermediate layer 4 is not particularly limited as long as the alloy of the $L1_0$ structure constituting the magnetic recording layer 5 can be epitaxially grown. Examples of the material forming the intermediate layer 4 include Cr, a Cr alloy having a BCC structure, and the like.

A Cr alloy having a BCC structure preferably contains one or more elements selected from the group consisting of Mn, V, Ti, Mo, W, Nb, and Ru.

Examples of Cr alloys having a BCC structure include CrTi alloys, CrV alloys, CrMn alloys, CrMo alloys, CrW alloys, CrRu alloys, and the like.

In the Cr alloy having a BCC structure, the Cr content (mol %) is highest among the constituent elements in the Cr alloy. That is, Cr is preferably a main component of the Cr alloy having a BCC structure.

The intermediate layer 4 may be constituted by a plurality of layers.

Other materials constituting the intermediate layer 4 include a NiAl alloy having a B2 structure or a RuAl alloy, MgO, or the like.

For example, a heat sink layer, a heat barrier layer or the like may be formed as the intermediate layer 4.

The heat sink layer includes, for example, Cu, Ag, Au, or Al.

When the magnetic head mounted with a laser light source records the information by heating the magnetic recording medium 100, the heat barrier layer suppresses the heat diffusion from the magnetic recording layer 5 in the direction of the substrate 1, thereby increasing the temperature of the magnetic recording layer 5.

Also, by forming the heat barrier layer, the (001)-orientation of the alloy having the $L1_0$ structure constituting the magnetic recording layer 5 can be improved.

The material constituting the heat barrier layer is not particularly limited as long as the material has a relatively low thermal conductivity and has a close lattice constant with the (001)-plane of an alloy having $L1_0$ structure. Examples of the material include TiN, TaN, TiC, MgO, NiO, or the like having the NaCl structure.

The heat barrier layer is preferably (100)-oriented. Therefore, another intermediate layer may be further formed between the soft magnetic underlayer 2 and the heat barrier layer.

The intermediate layer 4 may be omitted if necessary.

The magnetic recording layer 5 includes an alloy having an $L1_0$ structure.

Examples of alloys having an $L1_0$ structure include a FePt alloy and a CoPt alloy.

In the magnetic recording layer 5, the content (mol %) of an alloy having an $L1_0$ structure is highest among the constituent components. That is, the alloy having an $L1_0$ structure is preferably a main component of the material constituting the magnetic recording layer 5.

In the magnetic recording layer 5, the alloy grains having an $L1_0$ structure are preferably magnetically isolated. That is, the magnetic recording layer 5 preferably contains grain boundary phases. As a result, the SNR of the magnetic recording medium 100 is improved because the exchange coupling between the crystal grains is broken.

Examples of the materials constituting the grain boundary phase include $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, BN, and the like. Among these, two or more kinds of materials may be used in combination.

It is preferable to heat the substrate 1 when forming the magnetic recording layer 5 to facilitate the ordering of the alloy having an $L1_0$ structure.

The temperature at which the substrate 1 is heated is preferably 500° C. or higher.

Alternatively, the alloy having the $L1_0$ structure may further include elements such as Ag, Au, Cu, Ge, Pd, and the like. In this case, the temperature at which the substrate 1 is heated can be lowered to about 300 to 450° C.

The magnetic recording medium 100 may have a protective layer formed on the magnetic recording layer 5.

Examples of the material constituting the protective layer include a diamond-like carbon (DLC) or the like.

The method of forming the protective layer is not particularly limited. Examples of the method include an RF-CVD method in which the raw gas composed of hydrocarbon is decomposed by a high-frequency plasma to form the protective layer, an IBD method in which the raw gas is ionized with electrons emitted from the filament to form the protective layer, and an FCVA method in which the protective layer is formed using a solid C target.

The thickness of the protective layer is preferably from 1 nm to 6 nm. When the thickness of the protective layer is 1 nm or more, the floating characteristics of the magnetic head are improved. When the thickness is 6 nm or less, the magnetic spacing is reduced, and the SNR of the magnetic recording medium 100 is improved.

A lubricant may be applied on the protective layer of the magnetic recording medium 100.

Lubricants include, for example, a fluoropolymer such as perfluoropolyether.

The magnetic recording medium 100 may optionally be further formed with a seed layer, an adhesive layer or the like.

[Magnetic Storage Device]

Hereinafter, a magnetic storage device using a thermal assist recording method will be described as a magnetic storage device according to the present embodiment. However, the magnetic storage device according to the present embodiment is not limited to a magnetic storage device using a thermal assist recording method, but may be a magnetic storage device using a microwave assist recording method.

The magnetic storage device according to the present embodiment has the magnetic recording medium according to the present embodiment.

Preferably, the magnetic storage device according to the present embodiment further includes a magnetic recording media drive unit that rotates the magnetic recording media and a magnetic head having a near-field light-generating element at a tip thereof. The magnetic storage device according to the present embodiment further preferably includes a laser generator that heats the magnetic recording medium, a waveguide that guides the laser light generated from the laser generator to the near-field light-generating element, a magnetic head drive unit that moves the magnetic head, and a recording/reproduction signal processing system.

Figure 2:
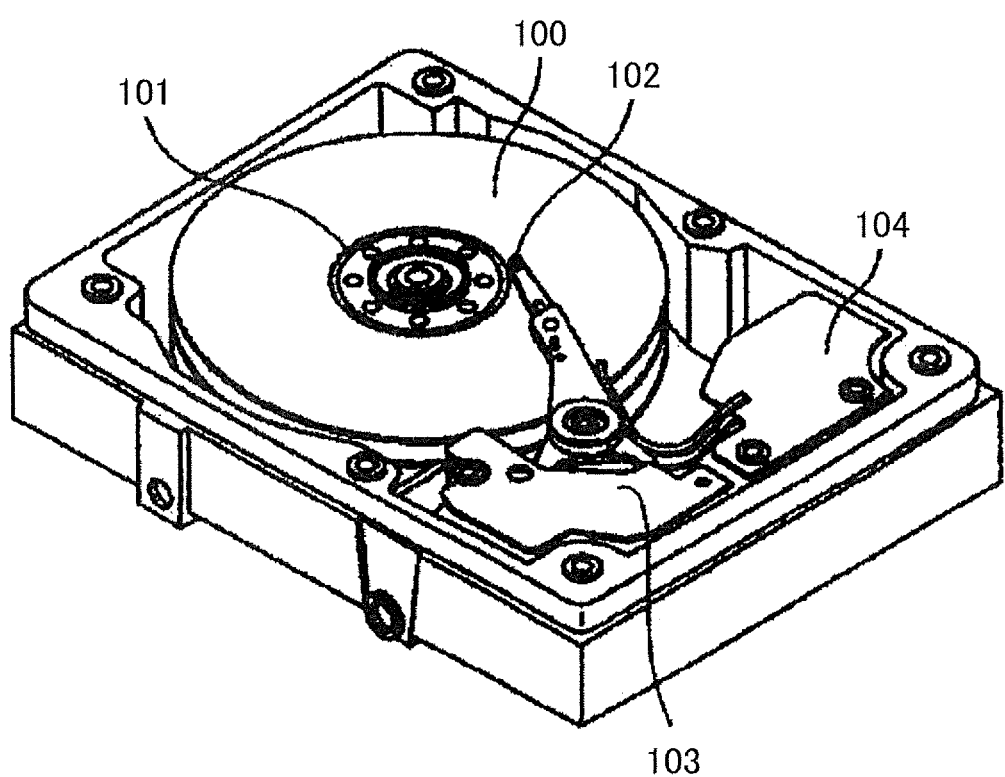
FIG. 2 is a perspective view illustrating an example of a magnetic storage device according to the present embodiment.

FIG. 2 shows an example of a magnetic storage device according to the present embodiment.

The magnetic storage device of FIG. 2 includes a magnetic recording medium 100, a magnetic recording media drive unit 101 that rotates the magnetic recording medium 100, a magnetic head 102, a magnetic head drive unit 103 that moves the magnetic head 102, and a recording/reproduction signal processing system 104.

Figure 3:
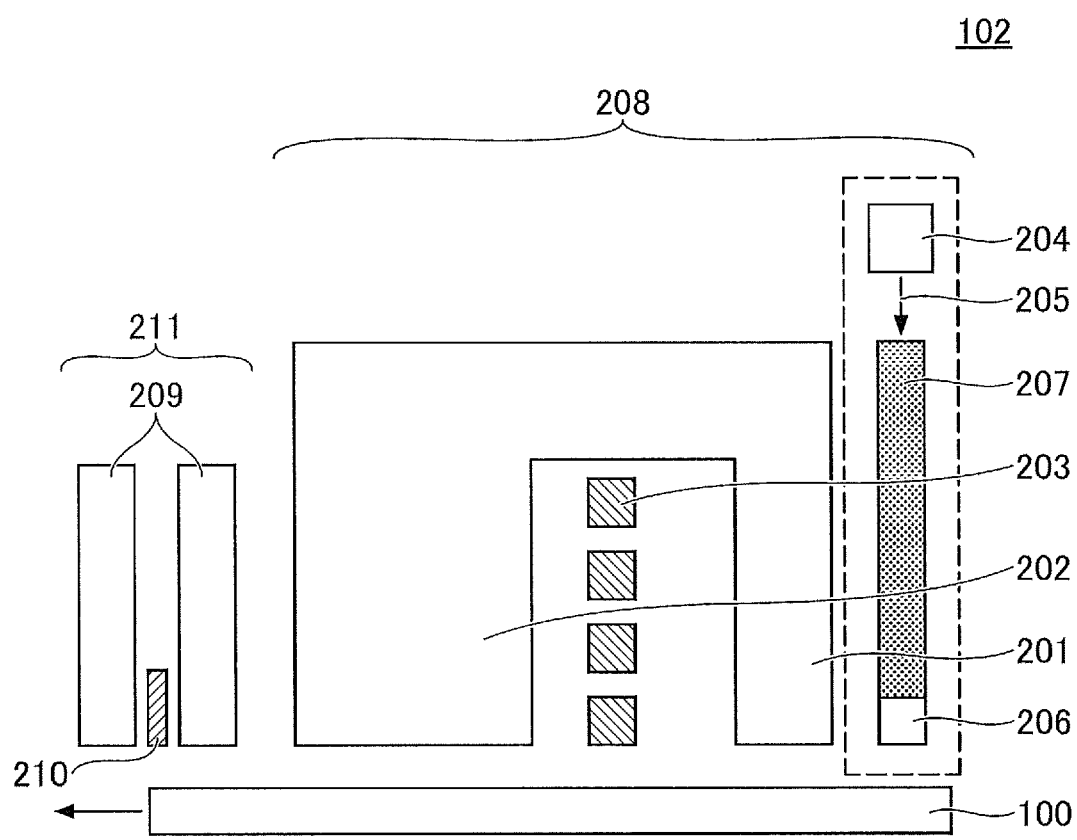
FIG. 3 is a schematic diagram showing a magnetic head of FIG. 2.

FIG. 3 represents a magnetic head 102.

The magnetic head 102 includes a recording head 208 and a reproducing head 211. The recording head 208 has a main pole 201, an auxiliary pole 202, a coil 203 that generates a magnetic field, a laser diode (LD) 204 as a laser generator, and a waveguide 207 that guides laser light 205 generated from the LD 204 to the near-field light-generating element 206.

The reproducing head 211 has a reproducing element 210 sandwiched between the shields 209.

The magnetic recording medium according to the present embodiment is used as the magnetic recording medium 100.

The recording head 208 can record information by heating the magnetic recording medium 100 with near-field light generated from the near-field light generating element 206 and decreasing the coercivity of the magnetic recording layer 5 of the magnetic recording medium 100 below the magnetic field of the recording head 208.

EXAMPLES

Hereinafter, examples of the present invention will be described, but the present invention is not limited to the examples.

Example 1-1

After forming a Ti-45 at % Al film (adhesive layer) with a thickness of 5 nm on a 2.5-inch heat-resistant glass substrate, a 71.1 mol % Fe-14.5 mol % B-5.8 mol % Nb-8.6 mol % Si film (a film having 71.1% by mol of Fe, 14.5% by mol of B, 5.8% by mol of Nb, and 8.6% by mol of Si) (soft magnetic underlayer) with a thickness of 60 nm was formed. Then, a 40 mol % Ta-40 mol % W-20 mol % Si film (amorphous barrier layer) with a thickness of 10 nm was formed. Then, a Cr-30 at % Mo film (the first intermediate layer) with a thickness of 10 nm, a 100 at % W film (second intermediate layer; the heat sink layer) with a thickness of 30 nm and a TiN film (the third intermediate layer; the heat barrier layer) with a thickness of 4 nm were formed. Then, after the substrate was heated to 600° C., a (Fe-50 at % Pt)-30 mol % C-5 mol % BN film (magnetic recording layer) with a thickness of 8 nm was formed. Then, a DLC film (protective layer) having a thickness of 3 nm was formed, and a magnetic recording medium was prepared.

Examples 1-2 to 1-8

The magnetic recording media were prepared in the same manner as Example 1-1, except that the compositions of the soft magnetic underlayer was changed to a 70.3 mol % Fe-13.8 mol % B-6.9 mol % Nb-9.1 mol % Si film in Example 1-2, to a 72.0 mol % Fe-15.9 mol % B-4.6 mol % Nb-7.5 mol % Si film in Example 1-3, to a 71.8 mol % Fe-14.5 mol % B-4.8 mol % Nb-8.8 mol % Si film in Example 1-4, to a 70.9 mol % Fe-12.4 mol % B-6.2 mol % Nb-10.5 mol % Si film in Example 1-5, to a 67 mol % Fe-12.5 mol % B-7.0 mol % Nb-13.5 mol % Si film in Example 1-6, to a 71.7 mol % Fe-12.9 mol % B-5.1 mol % Nb-10.3 mol % Si film in Example 1-7 and to a 70.5 mol % Fe-12.0 mol % B-5.5 mol % Nb-12.0 mol % Si film in Example 1-8.

Comparative Examples 1-1 to 1-7

The magnetic recording media were obtained in the same manner as Example 1-1, except that the compositions of the soft magnetic underlayer was changed to a 75.5 mol % Fe-8.0 mol % B-2.0 mol % Nb-14.5 mol % Si film in Comparative Example 1-2, to a 73.5 mol % Fe-6.0 mol % B-3.0 mol % Nb-17.5 mol % Si film in Comparative Example 1-2, to a 73.5 mol % Fe-9.0 mol % B-3.0 mol % Nb-14.5 mol % Si film in Comparative Example 1-3, to a 70.5 mol % Fe-17.0 mol % B-5.0 mol % Nb-7.5 mol % Si film in Comparative Example 1-4, to a 72.5 mol % Fe-17.0 mol % B-3.0 mol % Nb-7.5 mol % Si film in Comparative Example 1-5, to a 71.4 mol % Fe-18.0 mol % B-5.1 mol % Nb-5.5 mol % Si film in Comparative Example 1-6 and to a 70.7 mol % Fe-18.2 mol % B-6.1 mol % Nb-5.1 mol % Si film in Comparative Example 1-7.

Next, the coercive force of the soft magnetic layer of the magnetic recording media according to Examples 1-1 to 1-8 and Comparative Examples 1-1 to 1-7 were evaluated.

[Coercive Force of Soft Magnetic Layer]

A vibration sample magnetometer (VSM) was used to measure the coercive force of the soft magnetic layer of the magnetic recording media.

Next, perfluoropolyether (lubricant) was applied to the surface of the magnetic recording media of Examples 1-1 to 1-8 and Comparative Examples 1-1 to 1-7, and then the recording and reproduction characteristics were evaluated.

[Recording and Reproduction Characteristics]

The magnetic head of FIG. 3 was used to evaluate the SNR and OR characteristics of the magnetic recording media. Specifically, the SNR and OR characteristics of the magnetic recording media were evaluated by adjusting the power of the laser diode (LD) such that the line recording density was 1600 kFCI and the half-maximum width of the track profile was 55 nm.

Table 1 shows the evaluation results of the coercive force of the soft magnetic layer and recording and reproduction characteristics in the magnetic recording media.

TABLE 1

|  | Soft magnetic underlayer [mol %] | | | | Amorphous barrier layer [mol %] | | | Coercive force [Oe] | SNR [dB] | OW characteristic [dB] |
| --- | --- | --- | --- | --- | --- | --- | --- | --- | --- | --- |
|  | Fe | B | Nb | Si | Ta | W | Si |  |  |  |
| Example 1-1 | 71.1 | 14.5 | 5.8 | 8.6 | 40 | 40 | 20 | 10 | 12.0 | 40 |
| Example 1-2 | 70.3 | 13.8 | 6.9 | 9.1 | 40 | 40 | 20 | 12 | 11.8 | 40 |
| Example 1-3 | 72.0 | 15.9 | 4.6 | 7.5 | 40 | 40 | 20 | 15 | 11.6 | 39 |
| Example 1-4 | 71.8 | 14.5 | 4.8 | 8.8 | 40 | 40 | 20 | 20 | 11.3 | 39 |
| Example 1-5 | 70.9 | 12.4 | 6.2 | 10.5 | 40 | 40 | 20 | 30 | 11.0 | 37 |
| Example 1-6 | 67.0 | 12.5 | 7.0 | 13.5 | 40 | 40 | 20 | 32 | 11.0 | 37 |
| Example 1-7 | 71.7 | 12.9 | 5.1 | 10.3 | 40 | 40 | 20 | 36 | 10.8 | 37 |
| Example 1-8 | 70.5 | 12.0 | 5.5 | 12.0 | 40 | 40 | 20 | 40 | 10.5 | 36 |
| Comparative Example 1-1 | 75.5 | 8.0 | 2.0 | 14.5 | 40 | 40 | 20 | 59 | 9.2 | 34 |
| Comparative Example 1-2 | 73.5 | 6.0 | 3.0 | 17.5 | 40 | 40 | 20 | 65 | 8.7 | 28 |
| Comparative Example 1-3 | 73.5 | 9.0 | 3.0 | 14.5 | 40 | 40 | 20 | 50 | 9.4 | 35 |
| Comparative Example 1-4 | 70.5 | 17.0 | 5.0 | 7.5 | 40 | 40 | 20 | 57 | 9.0 | 30 |
| Comparative Example 1-5 | 72.5 | 17.0 | 3.0 | 7.5 | 40 | 40 | 20 | 63 | 8.9 | 28 |
| Comparative Example 1-6 | 71.4 | 18.0 | 5.1 | 5.5 | 40 | 40 | 20 | 61 | 8.9 | 29 |
| Comparative Example 1-7 | 70.7 | 18.2 | 6.1 | 5.1 | 40 | 40 | 20 | 117 | 7.0 | 25 |

From Table 1, the magnetic recording media in Examples 1-1 to 1-8 showed that the coercive force of the soft magnetic layers was in the range of 10 to 40 Oe, the SNR was in the range of 10.5 to 12.0 dB, and the OW characteristic was in the range of 36 to 40 dB.

In contrast, the magnetic recording media in Comparative Examples 1-1 to 1-7 showed that the coercive force of the soft magnetic layers was in the range of 50 to 117 Oe, the SNR was in the range of 7.0 to 9.4 dB, and the OW characteristic was in the range of 25 to 35 dB.

From the above, it can be seen that the soft magnetic underlayers of Comparative Examples 1-1 to 1-7 were insufficient as the soft magnetic underlayer of the thermal assist magnetic recording media.

Examples 2-1 to 2-5

The magnetic recording media were obtained in the same manner as Example 1-4, except that the compositions of the amorphous barrier layer was changed to a 50 mol % Ta-30 mol % W-20 mol % Si film in Example 2-1, to a 35 mol % Ta-35 mol % W-30 mol % Si film in Example 2-2, to a 40 mol % Ta-40 mol % W-20 mol % Si film in Example 2-3, to a 50 mol % Ta-30 mol % W-20 mol % Si film in Example 2-4 and to a 30 mol % Ta-50 mol % W-20 mol % Si film in Example 2-5.

Comparative Examples 2-1

The magnetic recording medium was obtained in the same manner as Examples 1-4, except that the amorphous barrier layer was not formed.

Comparative Examples 2-2 to 2-6

The magnetic recording media were obtained in the same manner as Example 1-4, except that the compositions of the amorphous barrier layer was changed to a 95 mol % Ta-5 mol % B film in Comparative Example 2-2, to a 80 mol % Ta-20 mol % Si film in Comparative Example 2-3, to a 10 mol % Ta-70 mol % W-20 mol % Si film in Comparative Example 2-4, to a 30 mol % Ta-30 mol % W-40 mol % Si film in Comparative Example 2-5 and to a 40 mol % Ta-40 mol % Mo-20 mol % Si film in Comparative Example 2-6.

Next, the coercive force of the soft magnetic layer and arithmetic mean roughness Ra in the magnetic recording media in Examples 2-1 to 2-5 and Comparative Examples 2-1 to 2-6 were evaluated.

[Arithmetic Mean Roughness]

An atomic force microscope (AFM) was used to measure the arithmetic mean roughness Ra of the magnetic recording media.

Next, perfluoropolyether (lubricant) was applied to the surface of the magnetic recording media in Examples 2-1 to 2-5 and Comparative Examples 2-1 to 2-6, and then the recording and reproduction characteristics were evaluated.

Table 2 shows the evaluation results of the coercive force of the soft magnetic layer, surface roughness Ra, and recording-reproduction characteristics in the magnetic recording media.

TABLE 2

| | Soft magnetic underlayer [mol %] | | | | Amorphous barrier layer [mol %] | | | | | Coercive force [Oe] | Ra [nm] | SNR [dB] | OW characteristic [dB] |
|---|---|---|---|---|---|---|---|---|---|---|---|---|---|
| | Fe | B | Nb | Si | Ta | W | Si | B | Mo | | | | |
| Example 2-1 | 71.8 | 14.5 | 4.8 | 8.8 | 50 | 30 | 20 | — | — | 42 | 0.241 | 10.5 | 36 |
| Example 2-2 | 71.8 | 14.5 | 4.8 | 8.8 | 35 | 35 | 30 | — | — | 43 | 0.230 | 10.5 | 36 |
| Example 2-3 | 71.8 | 14.5 | 4.8 | 8.8 | 40 | 40 | 20 | — | — | 40 | 0.212 | 10.7 | 36 |
| Example 2-4 | 71.8 | 14.5 | 4.8 | 8.8 | 50 | 30 | 20 | — | — | 42 | 0.228 | 10.6 | 36 |
| Example 2-5 | 71.8 | 14.5 | 4.8 | 8.8 | 30 | 50 | 20 | — | — | 43 | 0.256 | 10.5 | 36 |
| Comparative Example 2-1 | 71.8 | 14.5 | 4.8 | 8.8 | — | — | — | — | — | 72 | 0.814 | — | — |
| Comparative Example 2-2 | 71.8 | 14.5 | 4.8 | 8.8 | 95 | — | — | 5 | — | 58 | 0.637 | — | — |
| Comparative Example 2-3 | 71.8 | 14.5 | 4.8 | 8.8 | 80 | — | 20 | — | — | 52 | 0.539 | — | — |
| Comparative Example 2-4 | 71.8 | 14.5 | 4.8 | 8.8 | 10 | 70 | 20 | — | — | 56 | 0.323 | 9.0 | 30 |
| Comparative Example 2-5 | 71.8 | 14.5 | 4.8 | 8.8 | 30 | 30 | 40 | — | — | 81 | 0.303 | 7.5 | 26 |
| Comparative Example 2-6 | 71.8 | 14.5 | 4.8 | 8.8 | 40 | — | 20 | — | 40 | 81 | 0.350 | 7.9 | 26 |

From Table 2, the magnetic recording media in Examples 2-1 to 2-5 showed that the coercive force of the soft magnetic layer was in the range of 40 to 43 Oe, the Ra was in the range of 0.212 to 0.256 nm, the SNR was in the range of 10.5 to 10.7 dB and the OW characteristic was 36 dB.

In contrast, the magnetic recording media in Comparative Examples 2-1 to 2-3 showed that the coercive force of the soft magnetic layer was in the range of 52 to 72 Oe and the Ra was in the range of 0.539 to 0.814 nm. Further, the recording and reproduction characteristics of the magnetic recording media in Comparative Examples 2-1 to 2-3 could not be evaluated, because the magnetic head did not float stably.

The magnetic recording media in Comparative Examples 2-4 to 2-6 showed that the coercive force of the soft magnetic layer was in the range of 56 to 81 Oe, the Ra was in the range of 0.303 to 0.350 nm, the SNR was in the range of 7.5 to 9.0 dB and the OW characteristic was in the range of 26 to 30 dB.

From the above, it can be seen that the amorphous barrier layer of Comparative Examples 2-1 to 2-6 would be unsuitable as the amorphous barrier layer of the thermal assist magnetic recording media.

DESCRIPTION OF THE REFERENCE NUMERALS

1 Substrate
2 Soft magnetic underlayer
3 Amorphous barrier layer
4 Intermediate layer
5 Magnetic recording layer
100 Magnetic recording medium

What is claimed is:

1. A magnetic recording medium comprising:
a substrate;
a soft magnetic underlayer laminated on the substrate;
an amorphous barrier layer laminated on the soft magnetic underlayer; and
a magnetic recording layer laminated on the amorphous barrier layer,
wherein the soft magnetic underlayer includes Fe, B, Si, and one or more elements selected from the group consisting of Nb, Zr, Mo, and Ta,
wherein a content of B is in a range of 12% by mol to 16% by mol, and a content of Si is in a range from 5% by mol to 15% by mol,
wherein the amorphous barrier layer includes Si, W, and one or more elements selected from the group consisting of Nb, Zr, Mo, and Ta,
wherein a content of Si is in a range from 10% by mol to 30% by mol, and a content of W is in a range from 20% by mol to 60% by mol, and
wherein the magnetic recording layer includes an alloy having an $L1_0$ structure.

2. The magnetic recording medium according to claim 1, wherein a thickness of the amorphous barrier layer is in a range of 5 nm to 30 nm.

3. The magnetic recording medium according to claim 1, wherein the amorphous barrier layer includes a TaWSi alloy.

4. A magnetic storage device comprising the magnetic recording medium of claim 1.

* * * * *